Figure 3:
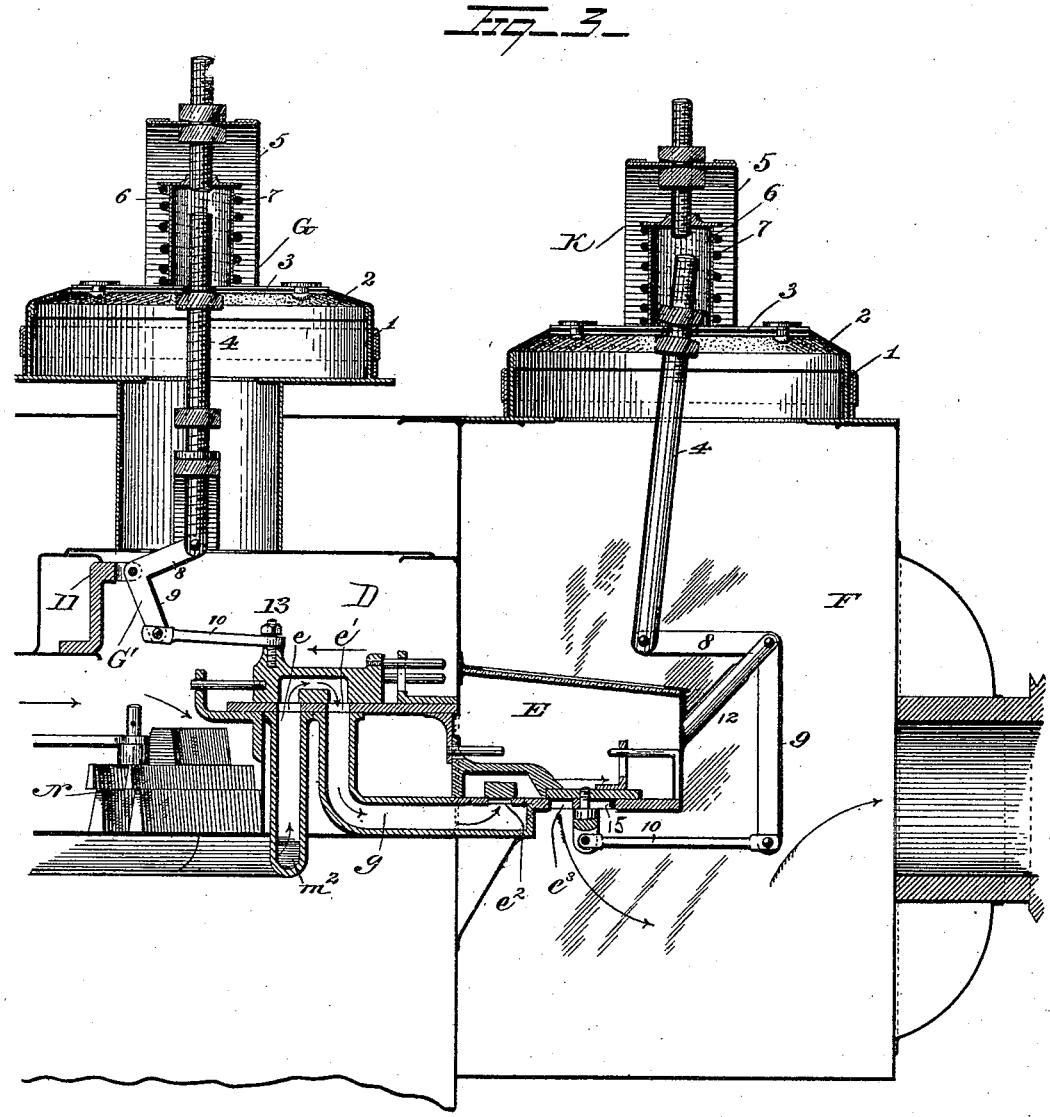

(No Model.) 4 Sheets—Sheet 1.
W. W. GOODWIN, E. T. LEE & J. H. MANSUR.
GAS METER.
No. 443,915. Patented Dec. 30, 1890.
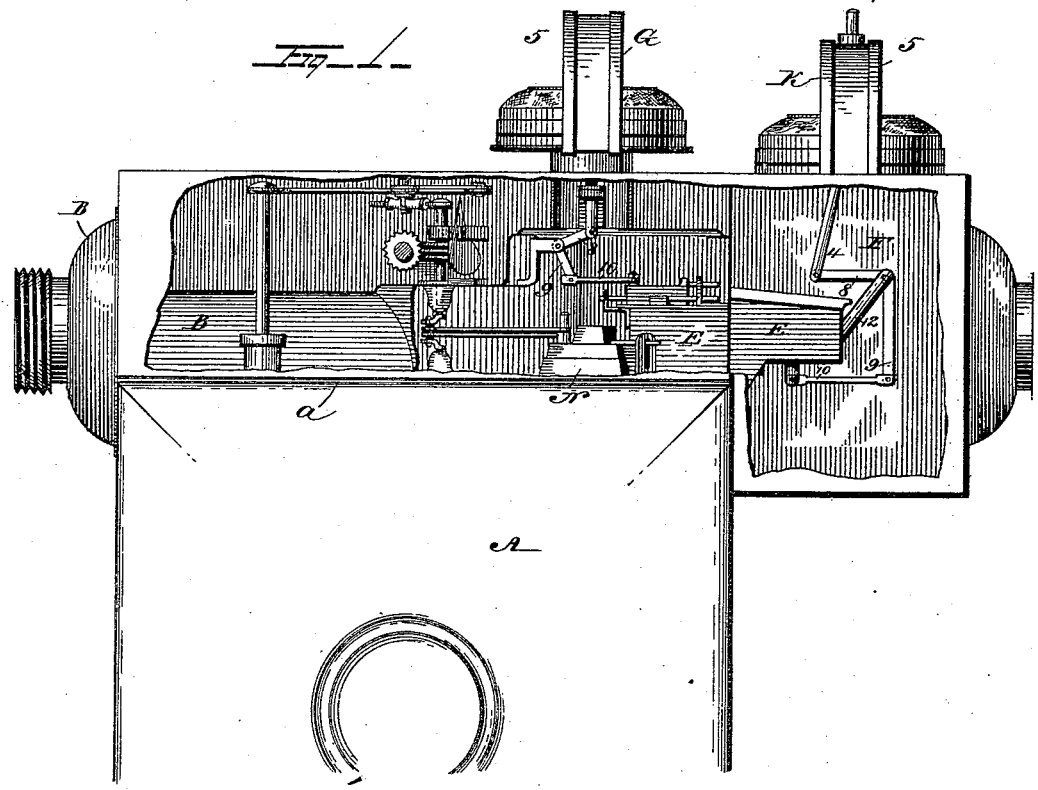
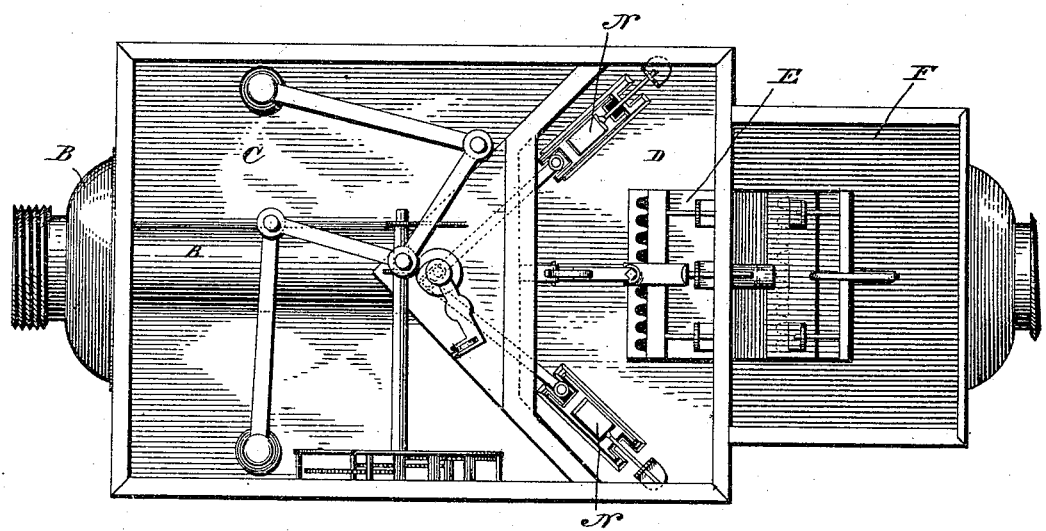
WITNESSES
INVENTORS
By their Attorney (No Model.) 4 Sheets—Sheet 2.

W. W. GOODWIN, E. T. LEE & J. H. MANSUR.
GAS METER.

No. 443,915. Patented Dec. 30, 1890.

(No Model.) 4 Sheets—Sheet 3.
W. W. GOODWIN, E. T. LEE & J. H. MANSUR.
GAS METER.
No. 443,915. Patented Dec. 30, 1890.
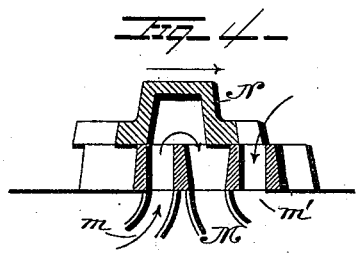
Fig. 4.
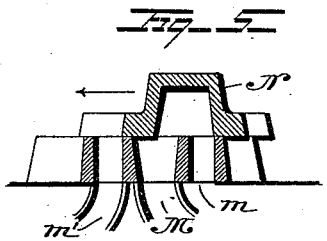
Fig. 5.
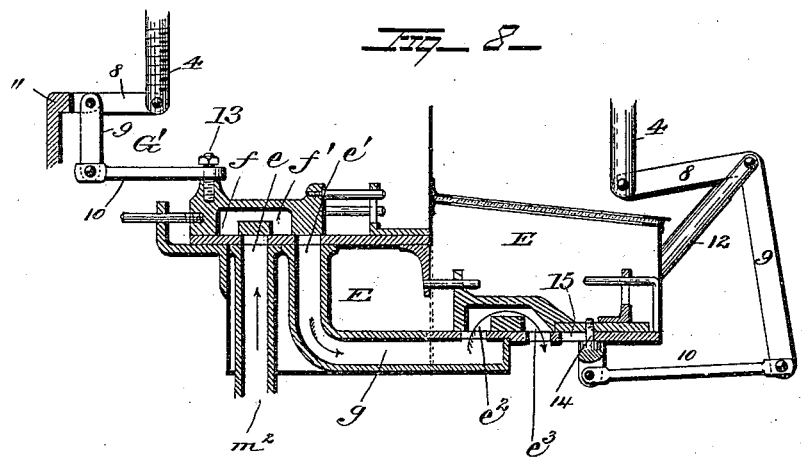
Fig. 8.
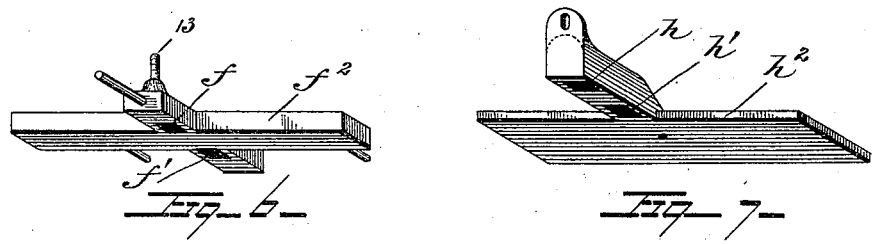
Fig. 6.
Fig. 7.
WITNESSES
INVENTORS
By their Attorney (No Model.) 4 Sheets—Sheet 4.
W. W. GOODWIN, E. T. LEE & J. H. MANSUR.
GAS METER.
No. 443,915. Patented Dec. 30, 1890.
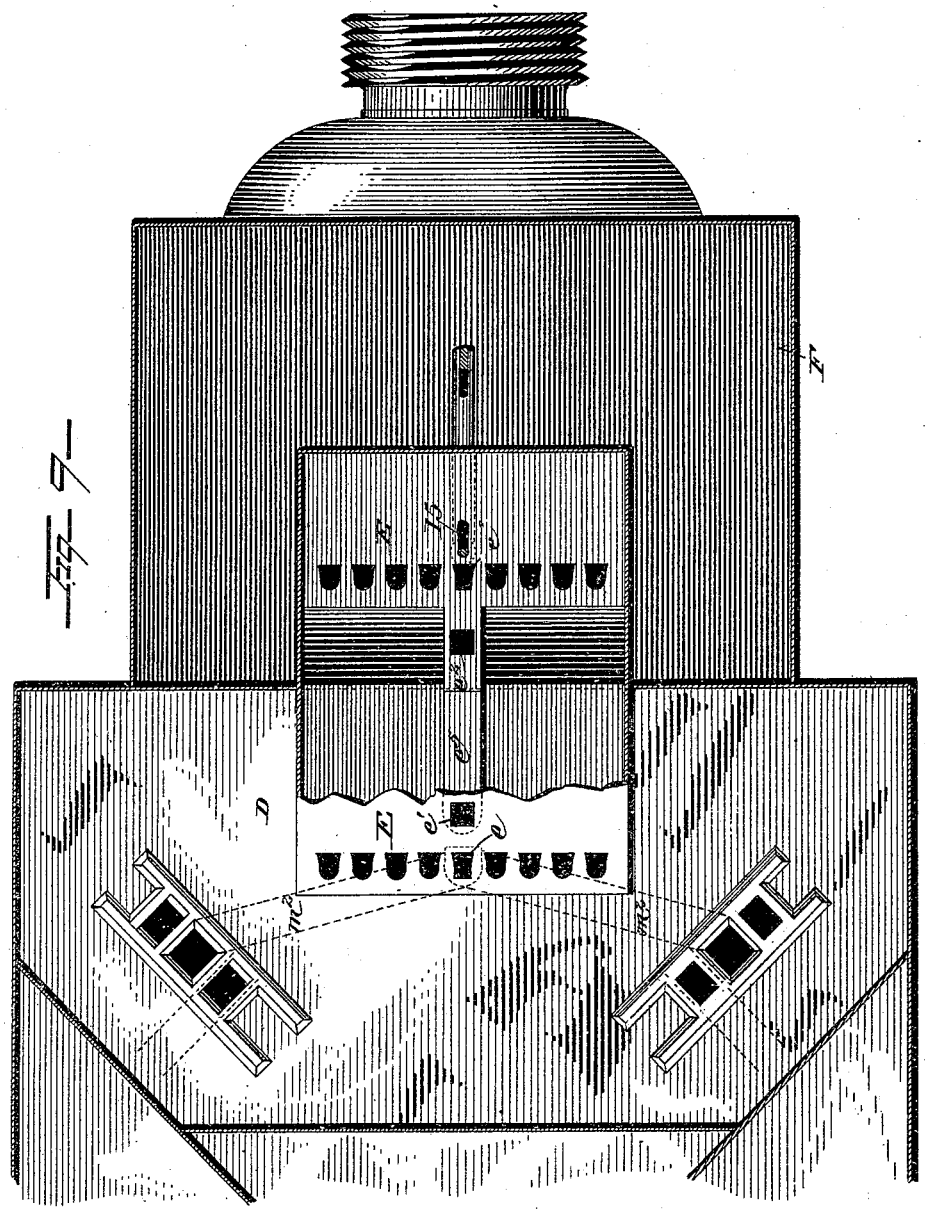
WITNESSES
INVENTORS
By their Attorney

UNITED STATES PATENT OFFICE.

WILLIAM W. GOODWIN, OF BORDENTOWN, NEW JERSEY, AND EDWARD T. LEE AND JOHN H. MANSUR, OF PHILADELPHIA, PENNSYLVANIA, ASSIGNORS TO THE GOODWIN GAS STOVE AND METER COMPANY, OF PENNSYLVANIA.

GAS-METER.

SPECIFICATION forming part of Letters Patent No. 443,915, dated December 30, 1890.

Application filed November 23, 1888. Serial No. 291,662. (No model.)

*To all whom it may concern:*

Be it known that we, WILLIAM W. GOODWIN, residing at Bordentown, county of Burlington, State of New Jersey, and EDWARD T. LEE and JOHN H. MANSUR, both residing at Philadelphia, in the State of Pennsylvania, all being citizens of the United States, have jointly invented certain new and useful Improvements in Gas-Meters, of which the following is a full, clear, and exact description, reference being had to the accompanying drawings, forming a part of this specification.

Our invention relates to meters adapted more particularly for controlling the pressure and measuring the volume of gases of high and variable pressures, notably "natural gases," so called. With such gases the pressure is so great and so variable that it is found impracticable to use the meters of the size, character, and construction now in common use for measuring the volume of manufactured gases, and wherein the whole volume of gas passing through the meter is measured, owing to the variability and relatively greater pressure of the former as compared with the latter. We have therefore invented certain improvements, hereinafter fully described, adapted to be used in connection with the ordinary meter, and shown in the drawings in connection with the dry or bellows meter, whereby the pressure of the gas on its admission into the usual first receiving-chamber of the meter is regulated and controlled by a pressure-regulating device which operates also to actuate mechanism to divide the volume of gas received into the meter through the induction-pipe into fixed and determinate proportions, one portion thereof being received into the usual measuring mechanism of the ordinary meter and the remainder permitted to pass without measurement, but not without control from the same device, into and through an intermediate receiving-chamber, and thence into the closed eduction-chamber, the divided parts of the whole volume being there reunited, its induction thereinto, as well as the back-pressure from the distributing gas-pipes, being regulated and controlled by a second and independent pressure-regulating mechanism before it passes to the final eduction-pipe of the meter.

In the accompanying drawings, in which similar letters and figures of reference indicate like parts in the several views, Figure 1 is a front elevation of an ordinary dry or bellows meter with a part of the upper casing broken away, so as to show the front chamber containing the registering mechanism, the usual receiving-chamber containing the pair of slide-valves leading to the bellows, and containing also the forward part of the intermediate receiving-chamber, with its first or induction slide-valve device, its actuating mechanism, including the first pressure-governor, also showing the second or eduction slide-valve device of said intermediate chamber, its actuating mechanism, and the final pressure-governor, and, lastly, showing the eduction or mixing chamber and exit-port of the meter. Fig. 2 is a top view with the upper casings of the meter and both governors removed, so as to show more clearly the arrangement of the aforesaid parts in the receiving-chambers, the slide-valve device operated by the first governor for primarily dividing the volume of gas received into the first receiving-chamber, also the arrangement of the intermediate receiving-chamber and its slide-valve mechanism. Fig. 3, Sheet 2, is a detached vertical sectional view of the several parts constituting our invention to be attached to the ordinary dry or bellows meter, and showing the construction and relative arrangement of the several parts. Figs. 4 and 5 are detached vertical sectional views, longitudinal, of the usual pair of meter-valves, the two end ports in each leading to the inside and outside, respectively, of the bellows or diaphragms in the meter-case, and the center or eduction port in each leading to a common connecting-tube communicating with the central port of the induction-valve of the intermediate chamber. Fig. 8 is a vertical sectional view showing the construction of the intermediate chamber, its induction and eduction slide-valves, and their central ports, whereby the whole volume of gas is primarily divided and afterward reunited by eduction therefrom into the final eduction-chamber, and showing the actuating mechanism whereby said valves are operated from by respective governors. Fig. 6 is a front elevation of the first slide-valve for the induction-ports of the intermediate chamber, and Fig. 7 a like view of the second slide valve for the eduction-ports of said chamber. Fig. 9 is a top view of a detached portion of the meter with the upper casings and both governors removed, so as to show the first or usual gas-receiving chamber and the intermediate and eduction chambers, and showing also the relative arrangement of and connection with the ordinary meter valve-ports leading to the usual measuring mechanism, of the first or induction slide-valve ports, of the intermediate chamber, the second slide-valve ports of said chamber, the connection between the central induction-port with the corresponding central eduction-port thereof, and also showing part of the mechanism to operate the second slide-valve.

Referring to Fig. 1, all that portion A of the meter below the flat casing $a$, inclosing the bellows or diaphragms, including the induction-tube B and chambers C and D, together with the usual dial registering mechanism, is old and constitutes the well-known form of dry or bellows gas-meter. It is therefore unnecessary to show the same more fully or to describe the same further than to mention that the meter-casing below the cover $a$ contains a pair of diaphragms or bellows which operate the ordinary valves N N and registering mechanism (shown in Figs. 1 and 2) in the usual manner, namely: Gas enters the induction-pipe B and is conveyed through the same into the first receiving-chamber D. In this chamber are located a pair of the usual slide-valves N N, (shown in Figs. 2, 4, 5, and 9,) one end port of one of the valves leading to one of the bellows and the other end port to the casing outside of the bellows. The other of said pair of usual slide-valves is arranged in like manner with the other bellows or diaphragm of the meter, except that the slides are so arranged in connecting with the actuating-rods that while one bellows is being filled with gas the other bellows is being emptied, and these are operated in such manner that the gas which passes down through either port in either valve by the constant alternate action of the bellows is brought up through either center port M M (see Figs. 4, 5, and 9) and leads through tubes $m^2$, having common connection with a vertical tube connecting with the port $e$ of the intermediate receiving-chamber E. (See Fig. 9.) This first receiving-chamber E is contained partly within the chamber D and partly within the eduction-chamber F. It is so arranged that its front upper edge is a valve-seat and is pierced with two or more induction ports or openings arranged side by side, and all of which, except the center port $e$ and its corresponding connecting valve-port $e'$, are by-ports which lead directly into the body of the receiving-chamber E, and these by-ports are all made the same or proportionately the same size in area as the end ports $m\ m'$ of the meter proper, leading to the bellows and main casing. The port $e'$ opens into a tube $g$ in the body of the chamber E, which tube terminates at its other end with a port or opening $e^2$ in line with its corresponding connecting valve-port $e^3$, which is the central port of a second set of ports corresponding exactly in size and arrangement with the first set of ports, of which $e$ is the center, but which second set of valve-ports are all eduction-ports for the gas.

The slide-valve for the first or induction set of ports is shown in Fig. 6, and it so operates as to wholly or partially cover all the ports in the row, and is so actuated by the first governor G through the connecting-link mechanism G', the connection being shown in Fig. 8 and also in Fig. 3. The slide-valve, Fig. 6, consists of a flat plate $f^2$ of a length equal to the width of receiving-chamber E, which forms its seat, and is provided with a cross-bar made hollow and having two openings $f$ and $f'$. These two openings correspond with the two ports $e$ and $e'$ of the intermediate receiving-chamber E. (See Figs. 3 and 8.) The normal position of the first or induction set of ports is closed, while that of the second or eduction set of ports of the intermediate receiving-chamber E is open. It will be noticed that in the case of both the first and second slide-valves of the receiving-chamber E the pressure of gas is downward upon the top of both the slides, and this is important to a successful operation of the device. Hence the induction-ports of the chamber E are on the top surface thereof, while the eduction-ports are at the bottom. Leading from the eduction-port $e'$ of the first set of ports is a tube $g$, passing through the chamber E and having at its other end a port $e^2$ in line with and corresponding to the central port $e^3$ of the row of eduction-ports of the chamber E.

The slide-valve operating the second or eduction set of ports of the chamber E is shown in Fig. 7, and consists of a flat plate $h^2$ of a sufficient width to cover all the ports in the row and having a hollow front projection provided with two openings $h$ and $h'$, whereby when the valve is in the appropriate position the port $e^2$ of the tube $g$ (see Fig. 8) communicates with the central port $e^3$ of the row of second or eduction set of ports of the receiving-chamber E. These two slide-valves, Figs. 6 and 7, are operated, respectively, by the pressure-governors G and K. (See Figs. 3 and 8.) These governors are precisely similar, but may be of any other form than those shown adequate to operate vertically and actuate the link mechanism. I prefer, however, the special and novel form and construction herein shown. They are set upon or in the top of the meter-case and communicate through the same with the chamber D and with the final eduction-chamber F, respectively. They consist of cylinder 1, having a metal end or top 3, of lesser circumference, connected to the body of the cylinder by some flexible material, such as rubber or cloth. Connected with the top or end 3 is a shaft 4, extending downward through the cylinder. The upper portion of said shaft when the top 3 is distended plays loosely in a small tube 6, secured by any appropriate means to a stationary top 5, supported from the outside of the cylinder 1, the said tube 6 being surrounded by a spiral spring 7, fastened to the top part thereof and extending down below the end of the said tube 6 when the governor is not distended and pressing against the plate 3. The result is that as the pressure of gas bears against the plate 3 it draws up the shaft 4, and the plate 3 will rise as far as permitted by the lower end of the cylinder 6, when, the pressure being wholly or partly removed, the spring 7 forces the plate 3 downward. As the shaft 4 is fixed to the plate 3, it has a vertical reciprocating motion as the plate 3 of the governor rises and falls, depending upon the pressure of the gas. This shaft 4 in both cases operates upon link mechanism consisting of the links 8, 9, and 10, in both cases secured to the frame-work by the standards 11 and 12, respectively, (see Figs. 3 and 8,) the link 10 in each case being secured to the slide-valve pin 13 in one case (see Fig. 6) and in the other case (see Figs. 7 and 8) to a pin 14, passing up beneath the chamber E and moving in a slot 15. (See Fig. 9.) The action of the parts is such that gas entering the induction-tube B and passing into the chamber D finds its exit through two opposite end ports of the slide-valves leading to the bellows or diaphragms and the main casing and to the exposed ports of the first or induction set of non-measuring ports of the intermediate chamber E, which latter ports are thus opened by the pressure against the governor G, which operates the link-motion connected with the slide-valve thereof. Thus the volume of gas is primarily divided, one portion passing through one meter-port to one of the diaphragms, one other portion passing through one other meter-port to the main casing, and the remaining volume of gas, entering the chamber D, passes through the open induction non-measuring ports of the chamber.

The principle upon which our improved meter is constructed is as follows: The usual valve-ports $m$ $m'$ of the meter receive and admit a portion of the whole volume of gas entering the chamber D, and the same is discharged through the central port $e$ of the intermediate chamber E, and is proportionately equal in volume to that portion of the entering volume of gas in the chamber D which passes through the induction by-ports into the body of the chamber E. Hence a fixed definite ratio or proportion of the volume of gas introduced into the first chamber D will pass into the measuring-valve ports leading to the diaphragms, and the remainder will pass through the induction by-ports of the chamber E. It will therefore only be the smaller volume, that passes down through the ordinary valve-ports of the meter into the diaphragms and casing and finds its exit finally through the central port $e$ of the chamber E, that is measured. This fraction, as previously mentioned in describing the operation of the device, passes finally through the central port $e$ of the second or eduction set of dividing-ports into the final eduction-chamber F, and there mixes with the other and larger volume of the gas which has passed through the induction by-ports of the chamber E into said chamber and out of the same through the corresponding eduction-ports of said chamber. The same slide-valve mechanism, Fig. 6, that controls the passage of the unmeasured gas through the eduction-ports of the chamber E also indirectly controls the operation of the measuring mechanism by acting simultaneously on its discharge eduction-tube $g$ of said chamber E, which latter therefore operates automatically to divide with absolute certainty the whole volume of gas into fixed proportions.

It will be apparent that on the principle on which this meter is constructed the eight exposed by-ports of the chamber E, both induction and eduction, may be reduced in number to vary the proportion of the whole volume of gas to be measured, and may consist of one large induction by-port equal in area to the eight shown, and so also with the eduction by-ports of the chamber E. The usual slide-valve bellows-ports of the meter are not changed from those in ordinary use in any respect, saving only that care is taken that the ports which lead to the bellows and casing shall be of such size that they will pass a volume of gas bearing a fixed proportion to that passing through the induction and eduction ports of the receiving-chamber E, and, as is well known, every meter must be primarily and separately tested to this end and its registering mechanism adjusted accordingly. In thus measuring a determinate fixed proportion of the volume of gas admitted to the meter the registering mechanism may, if desired, be adjusted by appropriate gearing-wheels to show the exact quantity passing through the meter instead of the proportional part actually measured.

In the construction of our improved meter the essential parts necessary to a successful operation are that there should exist between the first receiving-chamber D and the final eduction-chamber F the central intermediate chamber E, provided with a set of induction-ports opening into the chamber, covered and uncovered by an overset slide-valve controlled and operated by a separate and independent pressure-governor, and a second set of eduction-ports opening out from the chamber at the base thereof and which are in like manner covered and uncovered by an overset slide-valve operated and controlled by a separate and independent governor located within or communicating exclusively with the final eduction or mixing chamber F. One of the induction-ports of the chamber E communicates through a closed passage with one of the eduction-ports of said chamber, separately receiving and keeping separate the gas which has passed through the ordinary measuring mechanism of the meter until it is emitted into the mixing-chamber F. The others of said ports of the chamber E act simply as by-ports to receive and discharge the proportion of volume of gas which is not intended to be measured; but it is essential that its induction and eduction therefrom be regulated and controlled by separate and independent pressure-governors, and that the same governors and slide-valve mechanisms should operate to cover and uncover, respectively, by the same action both the central port for the measured gas as well as the by-ports of the intermediate chamber E.

As, independent of the usual back-pressure in the service-pipes, when one or more lights are cut off, gas of high or variable pressure, such as is intended to be measured by our improved meter, must itself be controlled and regulated in the first instance as to pressure, hence the apparatus is so constructed that the gas received into the first chamber D immediately acts upon the first governor G, which in turn operates the first slide-valve, Fig. 6, to wholly or partly uncover all the induction-ports of that chamber, the extent of its throw depending upon the amount of pressure of the gas. If the pressure is full and the governor entirely distended, the ports will be fully opened, their normal position being closed. The ports are so constructed as to size and adjusted by preliminary test that the same volume of gas in proportion therefore passes through the eight side induction-ports of the chamber E as passes through the central induction-port $e$ of said chamber by way of the ordinary metor valve-ports of the measuring mechanism. The eduction-ports of said chamber E at the base thereof are open in their normal position, and they are wholly or partially closed by the action of the slide-valve, Fig. 7, controlled through the link-motion of the second governor H, which communicates directly and exclusively with the final eduction-chamber F, and is not a gas-governor in the sense that the first governor is, but is solely a back-pressure governor. Hence the eduction-ports of the chamber being open in their normal position, and the link-motion of the slide-valve, Fig. 7, being so arranged in connection with the governor H that it will close the said ports when the governor H is distended, any back-pressure in the service-pipes will operate wholly or partially, according to the extent thereof, to shut off all of the said eduction-ports and stop the operation of the meter in whole or in part until said back-pressure is removed.

Having thus described our invention, what we claim is—

1. A gas-meter containing measuring mechanism, a primary receiving-chamber, a dividing-chamber having induction-ports $e\ e'$, leading by a closed passage from the measuring-valves, and like eduction-ports communicating therewith by a closed passage, said dividing-chamber having also induction by-ports leading from the primary receiving-chamber and corresponding eduction by-ports, a pressure-governor communicating directly with said primary receiving-chamber, and a slide-valve connected with the pressure-regulator and simultaneously controlling the said ports $e\ e'$ and the said induction by-ports of the dividing-chamber, the said ports and valves being adapted in area, relatively, to pass from the measuring-valves and by-ports volumes of gas bearing a fixed proportion to each other, substantially as described.

2. A gas-meter containing measuring mechanism, a primary receiving-chamber containing a vertical pressure-governor, a second chamber communicating directly with said primary chamber by means of one or more induction by-ports and indirectly by a closed passage leading from the measuring-valves and terminating in a valve-port contiguous to said by-ports, an overset slide-valve connected with said pressure-governor and controlling all the said ports, and actuating mechanism connecting said governor and valve, consisting of the links 8, 9, and 10, constructed and operating, substantially as described, to cause the valve to open the ports of the dividing-chamber as the pressure increases and to close the same as the pressure decreases, substantially as described.

3. A gas-meter having measuring mechanism and a receiving-chamber D, a second chamber E, through which passes gas in two proportionately-divided volumes to a final eduction or mixing chamber, an induction-port and communicating closed passage in said chamber E, admitting gas from the measuring-chamber, other induction-ports in said chamber E, leading gas from chamber D, eduction-ports corresponding with the induction-ports in said chamber E, and a pressure-governor located in said mixing-chamber and operating a valve which controls the passage of the gas into the said chamber E, substantially as and for the purposes described.

4. A gas-meter having measuring mechanism and a receiving-chamber, in combination with a second chamber communicating therewith and having separated passages for dividing the received gas into two volumes of fixed proportions, and a set of like eduction-ports corresponding to and communicating separately with the by-ports and measuring-ports of said second chamber, a valve simultaneously controlling the passage of gas to the eduction-ports from the receiving-chamber and from the measuring mechanism, and a like valve controlling the said eduction-passages in said second chamber, substantially as and for the purposes described.

5. The combination, with a meter containing registering and measuring mechanism and a main gas-receiving chamber D, into and from which the gas measured is received and discharged, of a mixing eduction-chamber F and an intermediate chamber E, the latter having induction-ports, of which a definite number communicate directly with the chamber D, and like eduction-ports communicating with the chamber F, and slide-valve mechanism for said ports operated by separate pressure-governors, the first communicating with the first receiving-chamber of the meter and the second communicating with the final eduction-chamber thereof, one or more of said induction and eduction ports being separately connected with each other and with each of the eduction valve-ports of the measuring mechanism of the meter, substantially as described.

6. The combination, with a gas-meter provided with registering and measuring mechanism and having a closed chamber D, of a second chamber E, communicating with the former by means of induction valve-ports of a certain area and communicating also with the measuring mechanism by one or more ports of similar area and provided with a slide-valve actuated by a pressure-governor communicating with said chamber D and covering and uncovering said induction valve-ports, a set of eduction-ports at the rear of said chamber E and a slide-valve for the same, with a governor and actuating mechanism operating the same and located within the eduction-chamber F, and closed connections between one or more of said induction and eduction ports and the central eduction valve-ports of the measuring mechanism, substantially as described.

7. The combination, with a gas-meter containing measuring mechanism and a gas-receiving chamber provided with valve-ports leading to and from said measuring mechanism, of a second chamber having induction-ports, one or more thereof communicating with said gas-receiving chamber and one other of said ports communicating with the eduction port or ports of the measuring mechanism, a slide-valve covering all the said ports and actuated by a pressure-governor, said second chamber having also eduction-ports, a slide-valve covering the same connecting actuating mechanism, and a pressure-governor located in the eduction-passage of the meter, substantially as described.

8. The combination, with a gas-meter containing measuring mechanism and a gas-receiving chamber D, provided with slide-valve and ports M and N, leading to and from said measuring mechanism, of a second chamber E, having one or more induction-ports communicating directly with said chamber D and one or more eduction-ports communicating directly with the final eduction-passage F of the meter, said chamber E being also provided with another induction-port $e$ and an induction-port $e^2$, connected by tube $g$ and communicating with the discharge-ports of the measuring-valves and with the eduction-passage F of the meter, slide-valve $f, f'$, and $f^2$ and pressure-regulating mechanism actuating the same, slide-valve $h, h'$, and $h^2$ and pressure-regulating mechanism operating the same, and a final eduction or mixing chamber F, said parts being constructed and combined substantially as described.

In testimony whereof we have hereunto affixed our signatures this 13th day of November, A. D. 1888.

WILLIAM W. GOODWIN.
EDWARD T. LEE.
JOHN H. MANSUR.

Witnesses:
H. T. FENTON,
W. L. GREENE.